US011076006B2

United States Patent
Cunico et al.

(10) Patent No.: US 11,076,006 B2
(45) Date of Patent: Jul. 27, 2021

(54) MANAGING ACTIVITY IN A COLLABORATIVE ENVIRONMENT

(71) Applicant: International Business Machines Corporation, Armonk, NY (US)

(72) Inventors: Hernan A. Cunico, Holly Springs, NC (US); Asima Silva, Holden, MA (US); Sean Callanan, Churchtown (IE); Liam S. Harpur, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 70 days.

(21) Appl. No.: 15/991,764

(22) Filed: May 29, 2018

(65) Prior Publication Data

US 2019/0373068 A1 Dec. 5, 2019

(51) Int. Cl.
*G06F 15/173* (2006.01)
*H04L 29/08* (2006.01)
*H04L 12/58* (2006.01)

(52) U.S. Cl.
CPC ............ *H04L 67/22* (2013.01); *H04L 51/046* (2013.01); *H04L 51/12* (2013.01); *H04L 51/24* (2013.01)

(58) Field of Classification Search
CPC ....... H04L 67/22; H04L 51/046; H04L 51/24; H04L 51/12; H04L 51/14
See application file for complete search history.

(56) References Cited

U.S. PATENT DOCUMENTS

| | | | |
|---|---|---|---|
| 6,515,681 B1 * | 2/2003 | Knight | G06Q 10/107 707/999.003 |
| 8,122,084 B2 | 2/2012 | Beringer | |
| 10,104,181 B1 * | 10/2018 | Rao | H04L 12/1818 |
| 2003/0020750 A1 * | 1/2003 | Brown | G06F 16/9535 715/752 |
| 2003/0050977 A1 * | 3/2003 | Puthenkulam | H04L 67/1072 709/204 |
| 2006/0053194 A1 * | 3/2006 | Schneider | H04L 12/1827 709/204 |

(Continued)

OTHER PUBLICATIONS

Samuel Hulick, "Slack, I'm Breaking Up with You", UserOnboard, https://ux.useronboard,com/slack-i-m-breaking-up-with-you-54600ace03ea, Feb. 29, 2016.

*Primary Examiner* — Cheikh T Ndiaye
(74) *Attorney, Agent, or Firm* — L. Jeffrey Kelly

(57) ABSTRACT

Embodiments generally relate to management of activity in a collaboration environment. In some embodiments, a method includes monitoring activity characteristics associated with at least one communication channel of a plurality of communication channels, wherein each communication channel enables communication associated with a respective topic. The method further includes determining user information from the activity characteristics, wherein the user information is associated with users who communicate with each other on the at least one communication channel. The method further includes determining timing information from the activity characteristics, wherein the timing information is associated with messages exchanged on the at least one communication channel. The method further includes managing notifications to the users who communicate with each other on the at least one communication channel based at least in part on the user information and the timing information.

20 Claims, 6 Drawing Sheets

(56) References Cited

U.S. PATENT DOCUMENTS

| | | | |
|---|---|---|---|
| 2008/0123587 A1* | 5/2008 | Xu | H04L 51/36 |
| | | | 370/329 |
| 2010/0325107 A1 | 12/2010 | Kenton et al. | |
| 2012/0011238 A1 | 1/2012 | Rathod | |
| 2012/0192086 A1* | 7/2012 | Ghods | H04L 12/1859 |
| | | | 715/753 |
| 2015/0019654 A1* | 1/2015 | Wheeler | H04L 51/24 |
| | | | 709/206 |
| 2016/0063840 A1* | 3/2016 | Kumarasamy Mani | |
| | | | H04L 67/22 |
| | | | 340/540 |
| 2018/0123815 A1* | 5/2018 | Milvaney | H04L 12/1827 |

* cited by examiner

| | | |
|---|---|---|
| 8:00 AM - 9:00 AM | Little to no activity | No cycle |
| 9:00 AM - 10:00 AM | Moderate activity | No cycle |
| 10:00 AM - 11:00 AM | High activity | Cycle 1 |
| 11:00 AM - 12:00 PM | Moderate activity | No cycle |
| 12:00 PM - 1:00 PM | Little to no activity | No cycle |
| 1:00 PM - 2:00 PM | Moderate activity | No cycle |
| 2:00 PM - 3:00 PM | High activity | Cycle 2 |
| 3:00 PM - 4:00 PM | High activity | Cycle 3 |
| 4:00 PM - 5:00 PM | Moderate activity | No cycle |
| 5:00 PM - 6:00 PM | Little to no activity | No cycle |

| Channel | Period of Interest | Analysis Recommendation | Recommend User or Content | Confidence | |
|---|---|---|---|---|---|
| Programming Contests | Day 6 to Day 15 | 5 cycles per day (see below) | Dynamic Group C | 89% | |
| | | | | | |
| | | | | | |
| Topic | Life Cycle Pattern | Recommendation To Share | Confidence | Timeout (minutes) | Dep. |
| Cycle 1 | Pattern 3 | Social Network → User 2 | 78% | 2 | Yes |
| Cycle 2 | Pattern 786 | Calendar Scheduling System → User 4 | 67% | 8 | Yes |
| Cycle 3 | Pattern 34 | Email → User 54 | 53% | 8 | No |
| Cycle 4 | Pattern 12 | Instant Messaging → Group 18 | 89% | 9 | Yes |
| Cycle 5 | Pattern 65 | Webpage Navigation → User 33 | 23% | 3 | Yes |

MANAGING ACTIVITY IN A COLLABORATIVE ENVIRONMENT

BACKGROUND

Collaborative applications provide a way for two or more individuals to communicate electronically. These applications use a workspace of channels to organize content, and everyone on those channels may have the same level of visibility and exposure to the content whether or not they are interested in the content. However, these applications have various drawbacks. For example, users constantly check for messages or updates (e.g., every 5 minutes), which is time consuming and distracts from productive work. Users spend much time waiting for a response from someone who may or may not be active on the system or may have already moved on to another channel. These applications often produce a large volume of messages that a user reads, and the many messages might not be useful to the user. Accordingly, the excessive amount of time expended negatively impacts the productivity of users and overall organizations.

SUMMARY

Disclosed herein is a method for managing activity in a collaboration environment, and a system and computer program product as specified in the independent claims. Embodiments are given in the dependent claims. Embodiments can be freely combined with each other if they are not mutually exclusive.

Embodiments manage activity in a collaboration environment. In some embodiments, a method includes monitoring activity characteristics associated with at least one communication channel of a plurality of communication channels, where each communication channel enables communication associated with a respective topic. The method further includes determining user information from the activity characteristics, where the user information is associated with users who communicate with each other on the at least one communication channel. The method further includes determining timing information from the activity characteristics, where the timing information is associated with messages exchanged on the at least one communication channel. The method further includes managing notifications to the users who communicate with each other on the at least one communication channel based at least in part on the user information and the timing information.

In another embodiment, the at least one processor further performs operations including determining a relevancy of the at least one communication channel, where the relevancy is based at least in part on a topic affinity. In another aspect, the user information includes a list of the users who communicate with each other on the at least one communication channel. In another aspect, the timing information includes active-time information. In another aspect, the timing information includes response-time information. In another aspect, to manage the notifications, the at least one processor further performs operations including filtering one or more notifications based on one or more notification policies, and where the one or more notification policies are based at least in part on the activity characteristics. In another aspect, to manage the notifications, the at least one processor further performs operations including filtering one or more notifications based on one or more notification policies, and where one or more of the notification policies are based at least in part on user preferences.

BRIEF DESCRIPTION OF THE DRAWINGS

FIG. 3 is a table showing example activity levels and example cycles, according to some embodiments.

FIG. 5 is a table showing example timing information, according to some embodiments.

DETAILED DESCRIPTION

Embodiments described herein manage activity in a collaboration environment. Embodiments improve a group or organization's timing and speed of communication in a collaboration environment.

Embodiments guide users when to engage in activity in a collaboration environment by controlling when notifications are sent to users and controlling which users receive the notifications. Embodiments use a cognitive approach that monitors the cadence and level of participation of different users and uses this information to engage users in a synchronized fashion throughout the day.

In some embodiments, a system monitors activity characteristics associated with communication channels of a collaboration environment. In various embodiments, a communication channel is a part of a collaboration environment or workspace of multiple channels. Each communication channel may be a group chat, a thread in a forum, a space for uploading and accessing documents, etc. Each communication channel enables communication associated with a respective topic. The system determines user information from the activity characteristics. The user information is associated with users who communicate with each other on each communication channel. The system also determines timing information from the activity characteristics. The timing information is associated with the messages exchanged on each communication channel. The system manages notifications to the users who communicate with each other on each communication channel based at least in part on the user information and the timing information. Such management of notifications optimizes the time that users spend in a collaboration environment, in that the average number of a user's browses of channels of the collaboration environment will dramatically decrease.

Figure 1:
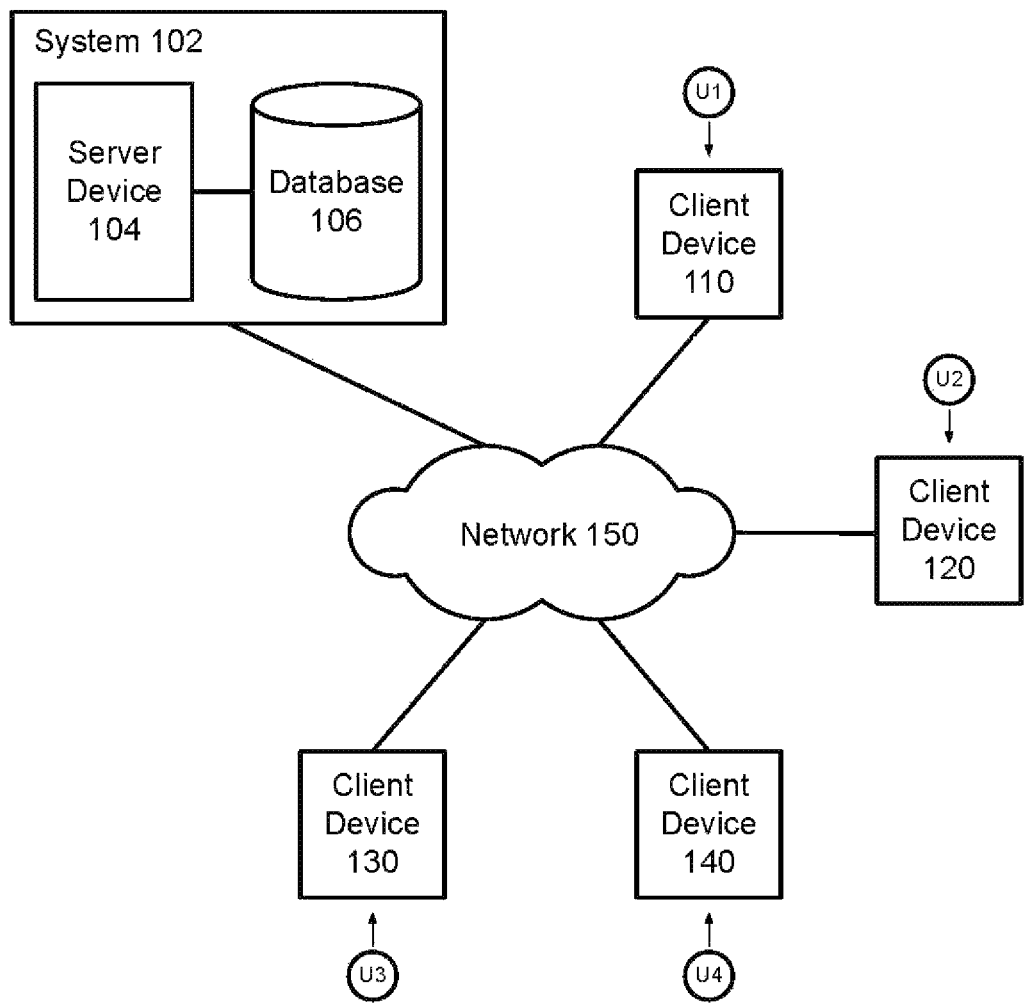
FIG. 1 is an example collaboration environment, according to some embodiments.

FIG. 1 is an example collaboration environment 100, according to some embodiments. Shown is a system 102, which includes a server device 104 and a database 106. In various embodiments, system 102 and client devices 110, 120, 130, and 140 may communicate with each other via wired and/or wireless connections associated with any suitable network such as network 150 or combination of networks.

In various embodiments, system 102 provides a collaborative environment or forum where two or more individuals communicate and collaborate electronically. System 102 provides a workspace that includes multiple communication channels that enable users to communicate on various topics. As indicated above, each communication channel may be a group chat, a thread in a forum, a space for uploading and accessing documents, etc. Each communication channel is associated with a different topic, and users on those channels collaborate via the respective communication channels. Users may post content and messages on the various communication channels. System 102 enables users to organize the content and messages on the communication channels.

As described in more detail herein, system 102 manages activity in the collaboration environment by intelligently sending out notifications to select users at select times when new content is posted and/or messages are posted. System 102 groups notifications based on various predetermined factors, which are based at least in part on user information and timing information. Further example embodiments and operations are described in more detail herein.

While server 102 performs embodiments described herein, in other embodiments, any suitable component or combination of components associated with the server 102 or any suitable processor or processors associated with server 102 may facilitate performing the embodiments described herein. In various embodiments, environment 100 may not have all of the components shown and/or may have other elements including other types of components instead of, or in addition to, those shown herein.

For ease of illustration, FIG. 1 shows one block for each of system 102, server device 104, and database 106, and shows four blocks for client devices 110, 120, 130, and 140. Blocks 102, 104, and 106 may represent multiple systems, server devices, and databases. Also, there may be any number of client devices. In other implementations, environment 100 may not have all of the components shown and/or may have other elements including other types of elements instead of, or in addition to, those shown herein. In various implementations, users U1, U2, U3, and U4 may interact with each other in the collaboration environment and/or interact with system 102 using respective client devices 110, 120, 130, and 140. In other implementations, there may be two to any number of users in the collaboration environment and/or interacting with system 102.

Figure 2:
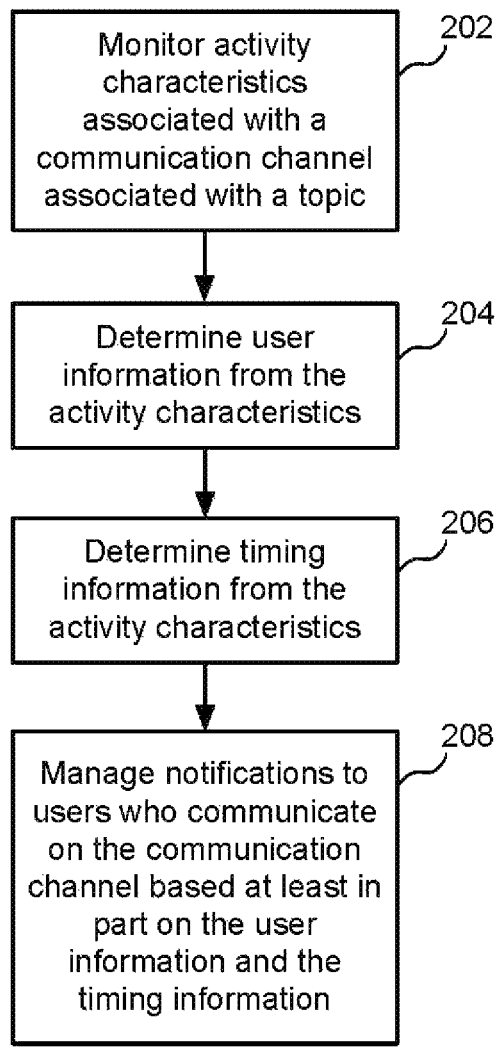
FIG. 2 is an example flow diagram for managing activity in a collaboration environment, according to some embodiments.

FIG. 2 is an example flow diagram for managing activity in a collaboration environment, according to some embodiments. Referring to both FIGS. 1 and 2, a method begins at block 202, where a system such as system 102 monitors activity characteristics associated with a communication channel, where the communication channel is associated with a topic. In various embodiments, server device 104 of system 102 may use an application programming interface (API) to collect the activity characteristics, as well as user information and timing information, which are described in more detail herein. Also, server device 104 may store the collected information in database 106 or other suitable storage location. While some embodiments are described herein in the context of one channel and a corresponding topic, these embodiments and others also apply to multiple channels and respective topics. In various embodiments, each communication channel enables communication associated with a respective topic.

As indicated herein, the system provides a collaborative environment where multiple users communicate and collaborate electronically. Each communication channel is associated with a different topic, and users on those channels collaborate via the respective communication channels. Users may post content and messages on the various communication channels. Each channel is a specific collaboration space in the general collaboration environment.

In various embodiments, the system receives data from the different channels. The data may include content, messages, etc. The system categorizes the data as it comes in and learns the activity characteristics of each communication channel. Example activity characteristics are described in more detail below.

FIG. 3 is a table 300 showing example activity levels and example cycles, according to some embodiments. As shown, the system monitors activity characteristics throughout the day. In this example, times shown are within example business hours. The system may monitor activity characteristics up to a 24-hour period and up to 7 days per week, as users who communicate in the collaboration environment may be located around the world in different time zones. Table 300 provides some activity characteristics of a given communication channel, including patterns of communication. There may be different tables associated with different respective communication channels.

Shown are example times in hour increments (e.g., 8:00 AM-9:00 AM, 9:00 AM 10:00 AM, 10:00 AM-11:00 AM, etc.). The actual length of each time slot may vary, depending on the particular implementation. For example, in some embodiments, the system may monitory activity in longer or shorter durations (e.g., 2-hour increments, 30-minute increments, 15-minute increments, etc.).

As shown, activity may vary throughout the day. For example, there may be little to no activity early morning, lunchtime, and at the end of the day. There may be moderate to high activity mid-morning and mid-afternoon. These are just examples, and activity may depend on the organization and nature of the work.

As described in more detail herein, the system sends out messages in cycles depending on the user information and timing information associated with messages in the particular channels. Example implementations directed to cycles, user information, and timing information are described in more detail herein.

In some embodiments, the system may determine the relevancy of each communication channel for each user, where the relevancy is a part of the activity characteristics. In various embodiments, the system manages the notifications for each communication channel based at least in part on the relevancy of the respective communication channel. For example, if a particular channel is of high relevancy for a particular user, the system may send notifications for that particular user for that particular channel more often that if the relevancy for that particular user were a low relevancy. As described in more detail below, the system may quantify the relevancy and generate one or more relevancy scores for a particular communication channel and/or user.

In various embodiments, the relevancy may be based on various relevancy factors, and the system may calculate a relevancy score for each relevancy factor. In some embodiments, the system assigns a total weight or total relevancy score to each communication channel, and for each user of each communication channel. The total relevancy score may be based at least in part on the relevancy scores associated with the various relevancy factors for each communication channel and for each user.

In some embodiments, the relevancy may be based at least in part on a topic affinity. In some embodiments, the relevancy may be based at least in part on a topic priority. For example, the system may enable a user to designate the topic as a high priority topic if the topic requires timely interaction (e.g., time critical, etc.). In some embodiments, the system may enable each user to indicate the priority for each topic (e.g., high priority, medium priority, low priority, etc.). A higher general topic priority may be given a higher relevancy score. Also, a higher individual user priority may be given a higher relevancy score (e.g. a project manager's entries may have a high relevancy score.) In some embodiments, the relevancy may be based at least in part on the frequency of updates. For example, a channel that has frequent updates may be deemed as having a higher relevancy. In some embodiments, the relevancy may be based at least in part on the one or more references to the user and previous interactions of the user. For example, a higher relevancy score may be given where there are more references to a given user and where there are more interactions by that user on that particular communication channel.

At block 204, the system determines user information from the activity characteristics. In various embodiments, the user information is associated with users who communicate with each other on the communication channel. For example, in various embodiments, the user information includes a list of users who communicate with each other on each communication channel. The system determines each user associated with each communication channel. The system may also determine user preferences such as priority, etc.

In various embodiments, any activity characteristics that the system may associate with an individual user or group of users may be deemed as user information. For example, the presence in one or more chats or communication sessions, participation levels, and actions that the system may associate with the particular user or group of users may be deemed as user information. In some embodiments, user information may also be determined from data independent from the activity characteristics. For example, a list of users, user preferences, etc. associated with a given communication channel may be created and stored separately from the activity characteristics information. As such, the system may fetch some user information from different storage locations.

At block 206, the system determines timing information from the activity characteristics. In various embodiments, the timing information is associated with messages exchanged on the communication channel. The system collects historical activity information, which includes various types of timing information. For example, in various embodiments, the timing information may include active-time information. This may include the amount of time each user spends on a given channel, when each user interacts with a given communication channel, how frequently each user interacts with a given communication channel, and how each user interacts with a given communication channel (e.g., reads messages/posts, comments on messages, initiates posts messages, posts content, etc.).

In various embodiments, the timing information includes response-time information. This may include the amount of time it takes a particular user to respond to a message. For example, the system may determine and log that User A tends to respond within 30 minutes of receiving a message notification. In another example, the system may determine and log that User B tends to respond between 10:00 am and 11:00 am, and between 3:00 pm and 4:00 pm.

In various embodiments, any activity characteristics that the system may associate with a particular time or times or time range, frequency, etc., may be deemed as timing information. Note that some information may be deemed as both user information and timing information, and the system distinguished between aspects that are associated with each of the user information and timing information. In the example above, where User B tends to respond between 10:00 am and 11:00 am, and between 3:00 pm and 4:00 pm, the aspect that User B tends to respond during these time ranges may be deemed as user information. The time ranges and what happens during the time ranges (e.g., responds, etc.) may be deemed as timing information.

The system may determine a timeout for each communication channel. In some embodiments, a timeout is the time after which the system stops showing a notification. In other words, the notification goes away rather than being present all day. In some embodiments, the system may wait until the next cycle to send out the notification.

At block 208, the system manages notifications to the users who communicate with each other on the communication channel. In various embodiments, the system manages the notifications based at least in part on the user information and the timing information.

As indicated herein, the system manages activity in the collaboration environment by intelligently sending out notifications to select users at select times when new content is posted and/or messages are posted.

The system groups notifications based on various predetermined factors, which are based at least in part on user information and timing information.

In some embodiments, the system selectively makes recommendations to each user. For example, the system may send a notification to a given user, where the notification guides the user to particular communication channels.

In some embodiments, the system selectively makes recommendations to a group of users. For example, the system notify the group of users at the same time to check messages or to interact on a given communication channel. This encourages a consolidated collaboration session, or focused chat, or focus channel session, etc., wherein the combination of the particular participants and the time period are optimized. The group notification may be referred to as a suggestion for a focused chat. The group may be based at least in part on the user information, and the timing may be based at least in part on the timing information. For example, a notification may go to a subgroup of users who interact most frequently and at a particular time.

In an example scenario, the system sends out notifications simultaneously to a group or subgroup of users of a given communication channel (e.g., User A and User B, or group C, etc.). These users will see a request to view the particular communication channel (e.g., "products" channel) at a particular time (e.g., 11:00 am). In some embodiments, the system may send out notification in particular to synchronize a group or subgroup of users with different delays for individual users. For example, User A and User B may receive notifications to encourage User A and User B to begin interacting on the communication channel. Based on the user information, the system may have determined that User A and User B are the most active users on the given communication channel, and that User A and User B tend to encourage more participation among other users. User C and User D may receive notifications at a determined delayed time (e.g., 10 minutes later). As such, by the time Users C and D join the interaction, User A and User B may already be interacting. This is advantageous in that it encourages more focused, interactive, and productive time on the communication channel.

In some embodiments, the timing may be ascertained by an analysis of previous interactions such that the average number of user's browses will dramatically decrease. For example, suppose that UserA used to check the communication channels frequently (e.g., 16 times a day on average).

Embodiments described herein may guide User A to check particular communication channels 3 times a day on average. As such, the system recommends how frequently to check particular communication channels. In various embodiments, such a recommendation it based on the system learning patterns of significant productivity at those 3 specific times during the day. As such, the system replicates that pattern by intelligently sending out notifications (e.g., focused channel requests, etc.). The system may also manage the speed or length of focus on the particular channel. These embodiments relieve pressure on the user to check a communication channel multiple times throughout the day, thereby saving time and increasing productivity. In some embodiments, the system may automatically create dynamic sub-channels organized by topics and/or participation group.

In some embodiments, the system may integrate notifications with a calendar/scheduling system to display the availability of one or more users. For example, if a user is out on vacation, the system may notify the sub-channel (e.g., each participating individual) about the user being out of the office.

Figure 4:
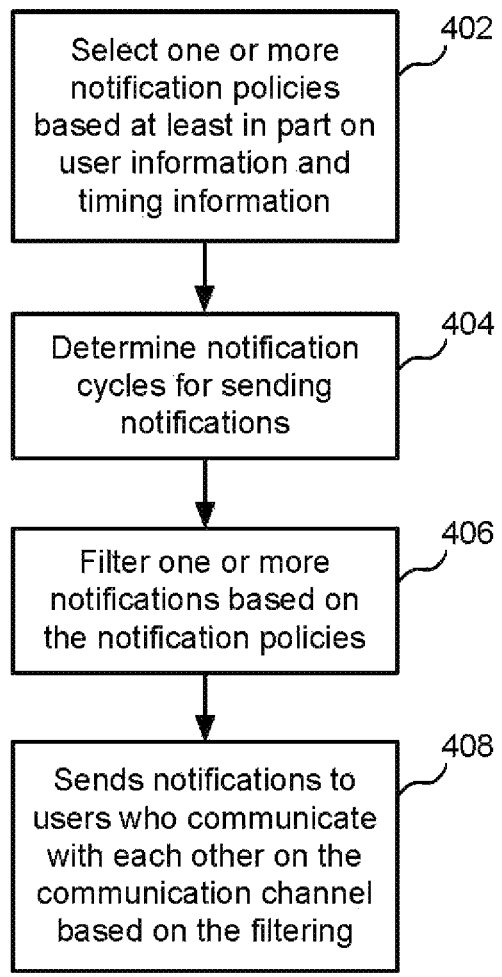
FIG. 4 is an example flow diagram for managing notifications in a collaboration environment, according to some embodiments.

Example embodiments directed to managing notifications based on user information and timing information are described in more detail herein in connection with FIG. 4.

FIG. 4 is an example flow diagram for managing notifications in a collaboration environment, according to some embodiments. As indicated herein, the system manages notifications to users, based at least in part on the user information and the timing information. The following describes an example flow embodiment for managing notifications. Referring to both FIGS. 1 and 2, a method begins at block 402, where a system such as system 102 selects one or more notification policies based at least in part on user information and timing information.

At block 404, the system determines notification cycles for sending notifications to users who communicate with each other on the communication channel based at least in part on the user information and the timing information.

FIG. 5 is a table 500 showing example timing information, according to some embodiments. As shown, table 500 provides timing information on a channel labeled "Programming Contests." The period of interest, where there has been higher activity, is from day 6 to day 15. In the example, the system recommends 5 cycles per day for sending out notifications. The system recommends sending notifications to a Dynamic Group C, which may be a high-priority group from this communication channel. Associated with this communication channel is a confidence level of 89%.

The number of cycles recommended by the system may vary, and will depend on the particular user information and timing information. As shown in the particular example, there are 5 recommended cycles, Cycle 1, Cycle 2, Cycle 3, Cycle 4, and Cycle 5. Each cycle has a particular life cycle pattern. For example, Cycle 1 is associated with a Pattern 3. Cycles 2, 3, 4, and 5 are associated with respective Patterns 786, 34, 12, and 65. In various embodiments, life cycle patterns may be based at least in part on patterns derived from the user information and timing information. In various embodiments, each life cycle pattern (e.g., Pattern 3, Pattern 786, etc.) describes the behavior that specific end users and/or groups see when looking at a collaboration tool with many discussion threads during the cycle (e.g., Cycle 1, Cycle 2, etc.). For example, if a User K is active in a Sub Group 2, a User M may see a coordinated viewing time of 20 seconds at the same time. The system determines these behavior patterns for the cycle. In various embodiments, the length of a particular cycle may vary, and will depend on the particular implementation. For example, a cycle may be 60 minutes, 90 minutes, 2 hours, etc. In some embodiments, the system may dynamically adjust the number of cycles based on how the activity characteristics change over time.

In various embodiments, each cycle is associated with a sharing recommendation. For example, during Cycle 1 the system recommends sending a notification associated with a social network to User 2. In various embodiments, social network is an example of a communication channel or communication a sub-channel. Calendar scheduling system, email, instant messaging, webpage navigation are other examples of communication channels or communication sub-channels.

Also, there is a 78% confidence level, a 2-minute timeout, and one or more dependencies. In this particular example, the system is 78% confident that the specific pattern recommendation is applicable in this scenario. For example, the specific pattern recommendation might be that when User K is active in Sub Group 2, User M will see a coordinated viewing time of 20 seconds at the same time. With regard to the timeout, in this example, the system removes the notifications in 2 minutes. With regard to dependencies, a particular interaction may require at least 2 to 3 users to be available or may require a particular user to be available for a particular cycle to be established. In another example of a dependency, the system might require that User X sees the communication channel 10 seconds before User Y sees the communication channel. As such, the system may wait until User X sees the communication channel for 10 seconds before sending a notification to User Y to view the communication channel. This aspects are beneficial in that the system automatically sends out notifications to particular users and particular times based on the user and timing information.

In another example, during Cycle 2 the system recommends sending a notification associated with a calendar scheduling system to User 4. Also, there is a 67% confidence level, an 8-minute timeout, and one or more dependencies.

In another example, during Cycle 3 the system recommends sending a notification associated with an email to User 44. Also, there is a 53% confidence level, an 8-minute timeout, and no dependency.

In another example, during Cycle 4 the system recommends sending a notification associated with instant messaging to Group 18. Also, there is a 89% confidence level, an 9-minute timeout, and one or more dependencies. In this particular example, Group 18 a subgroup of Dynamic Group C. Similarly, Users 2, 4, 54, and 33 are users associated with Dynamic Group C.

In another example, during Cycle 5 the system recommends sending a notification associated with a email to User 33. Also, there is a 23% confidence level, a 3-minute timeout, and one or more dependencies.

At block 406, the system filters one or more notifications based on one or more notification policies, and where the one or more notification policies are based at least in part on activity characteristics. For example, in some embodiments, at least one filtering policy may include delaying the sending of the notifications to all users until a predetermined time. In some embodiments, at least one filtering policy may include delaying the sending of the notifications for some users until a predetermined time. In some embodiments, a filtering policy may include autonomic filtering that involves a self-learning engine that acknowledges a category or class of each channel (e.g., engineering, management, marketing, sales, etc.) and a topic associated with each channels.

In some embodiments, the one or more of the notification policies are based at least in part on user preferences. In some embodiments, the system enables the user to apply one or more of the filtering policies based on the one or more recommendations. In some embodiments, at least one filtering policy may include temporal filtering that is associated with a time range from which the user opts-out or opts-in. In some embodiments, a filtering policy may include social network filtering that involves a preference that people in the user's social network are deemed close network nodes. In some embodiments, a filtering policy may include organizational filtering that enables the user to prioritize particular individuals in one or more of the user's team, department, and business unit. In some embodiments, a filtering policy may include user-defined filtering that enables the user to state deterministically the individuals the user wants to filter.

At block 408, the system sends notifications to users who communicate with each other on the communication channel based on the filtering.

Although the steps, operations, or computations may be presented in a specific order, the order may be changed in particular embodiments. Other orderings of the steps are possible, depending on the particular embodiment. In some particular embodiments, multiple steps shown as sequential in this specification may be performed at the same time. Also, some embodiments may not have all of the steps shown and/or may have other steps instead of, or in addition to, those shown herein.

Embodiments provide various benefits. For example, embodiments provide a cognitive system that regulates the amount of information shared in a collaborative environment, as well as provide guidance regarding the amount of time a user should spend monitoring channels in the collaborative environment. Embodiments relieves pressure on the user to check communication channel multiple times throughout the day, thereby saving time and increasing productivity.

Figure 6:
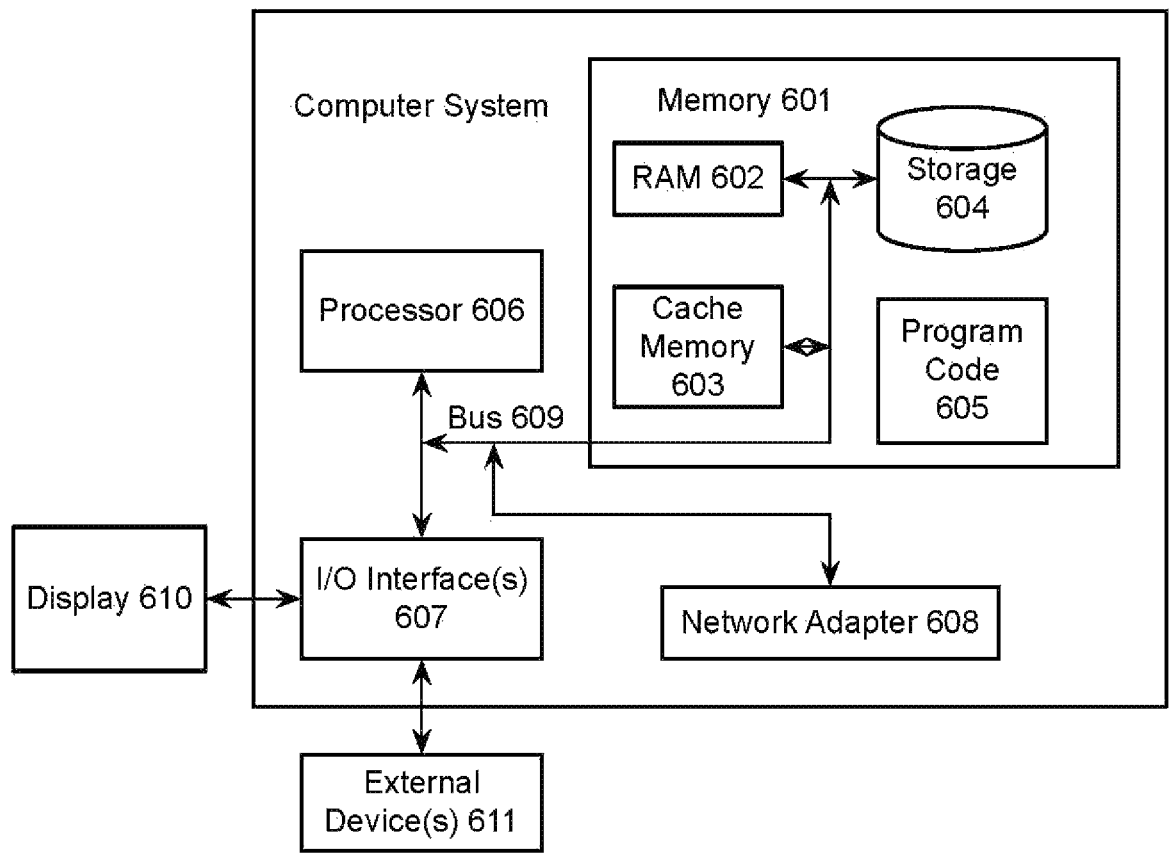
FIG. 6 is a block diagram of an example computer system, which may be used for embodiments described herein.

FIG. 6 is a block diagram of an example computer system 600, which may be used for embodiments described herein. The computer system 600 is operationally coupled to one or more processing units such as processor 606, a memory 601, and a bus 609 that couples various system components, including the memory 601 to the processor 606. The bus 609 represents one or more of any of several types of bus structure, including a memory bus or memory controller, a peripheral bus, an accelerated graphics port, and a processor or local bus using any of a variety of bus architectures. The memory 601 may include computer readable media in the form of volatile memory, such as random access memory (RAM) 602 or cache memory 603, or storage 604, which may include non-volatile storage media or other types of memory. The memory 601 may include at least one program product having a set of at least one program code module such as program code 605 that are configured to carry out the functions of embodiment of the present invention when executed by the processor 606. The computer system 600 may also communicate with a display 610 or one or more other external devices 611 via input/output (I/O) interfaces 607. The computer system 600 may communicate with one or more networks via network adapter 608.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system comprising:
   at least one processor and a computer readable storage medium having program instructions embodied therewith, the program instructions executable by the at least one processor to cause the at least one processor to perform operations comprising:
   monitoring activity characteristics associated with at least one communication channel of a plurality of communication channels, wherein each communication channel enables communication associated with a respective topic, and wherein the activity characteristics comprise patterns of communication of one or more users associated with each communication channel;
   determining user information from the activity characteristics, wherein the user information is associated with each user who interacts with other users on each communication channel;
   determining timing information from the activity characteristics, wherein the timing information is associated with messages exchanged on each communication channel, and wherein the timing information comprises one or more of amounts of time each user spends on each communication channel, times each user interacts with a given communication channel, how frequently each user interacts with a given communication channel, and how each user interacts with a given communication channel;
   determining notification cycles for sending notifications to users associated with a particular communication channel based on one or more notification policies, wherein at least one notification policy of the one or more notification policies comprises:
      sending the notifications to a first subset of users associated with the particular communication channel during a first notification cycle; and
      sending the notifications to a second subset of users associated with the particular communication channel during a second notification cycle; and
   managing notifications to the users who communicate with each other on each communication channel based on the notification cycles.

2. The system of claim 1, wherein the at least one processor further performs operations comprising determining a relevancy of the at least one communication channel, wherein the relevancy is based at least in part on a topic affinity.

3. The system of claim 1, wherein the user information includes a list of the users who communicate with each other on the at least one communication channel.

4. The system of claim 1, wherein the timing information comprises active-time information, wherein the active-time information comprises the one or more types of interactions of each user, and where the one or more types of interactions comprises one or more of commenting on messages, posting messages, and posting content.

5. The system of claim 1, wherein the timing information comprises response-time information.

6. The system of claim 1, wherein to manage the notifications, the at least one processor further performs operations comprising filtering one or more notifications based on the one or more notification policies, and wherein the one or more notification policies are based at least in part on the activity characteristics.

7. The system of claim 1, wherein to manage the notifications, the at least one processor further performs operations comprising filtering one or more notifications based on the one or more notification policies, and wherein one or more of the notification policies are based at least in part on user preferences.

8. A computer program product comprising a computer readable storage medium having program instructions embodied therewith, the program instructions executable by at least one processor to cause the at least one processor to perform operations comprising:
monitoring activity characteristics associated with at least one communication channel of a plurality of communication channels, wherein each communication channel enables communication associated with a respective topic, and wherein the activity characteristics comprise patterns of communication of one or more users associated with each communication channel;
determining user information from the activity characteristics, wherein the user information is associated with each user who interacts with other users on each communication channel;
determining timing information from the activity characteristics, wherein the timing information is associated with messages exchanged on each communication channel, and wherein the timing information comprises one or more of amounts of time each user spends on each communication channel, times each user interacts with a given communication channel, how frequently each user interacts with a given communication channel, and how each user interacts with a given communication channel;
determining notification cycles for sending notifications to users associated with a particular communication channel based on one or more notification policies, wherein at least one notification policy of the one or more notification policies comprises:
sending the notifications to a first subset of users associated with the particular communication channel during a first notification cycle; and
sending the notifications to a second subset of users associated with the particular communication channel during a second notification cycle; and
managing notifications to the users who communicate with each other on each communication channel based at least in part on the user information and the timing information on the notification cycles.

9. The computer program product of claim 8, wherein the at least one processor further performs operations comprising determining a relevancy of the at least one communication channel, wherein the relevancy is based at least in part on a topic affinity.

10. The computer program product of claim 8, wherein the user information includes a list of the users who communicate with each other on the at least one communication channel.

11. The computer program product of claim 8, wherein the timing information comprises active-time information.

12. The computer program product of claim 8, wherein the at least one processor further performs operations comprising, wherein the timing information comprises response-time information.

13. The computer program product of claim 8, wherein, to manage the notifications, the at least one processor further performs operations comprising filtering one or more notifications based on the one or more notification policies, and wherein the one or more notification policies are based at least in part on the activity characteristics.

14. The computer program product of claim 8, wherein, to manage the notifications, the at least one processor further performs operations comprising filtering one or more notifications based on the one or more notification policies, and wherein one or more of the notification policies are based at least in part on user preferences.

15. A computer-implemented method for managing activity in a collaboration environment, the method comprising:
monitoring activity characteristics associated with at least one communication channel of a plurality of communication channels, wherein each communication channel enables communication associated with a respective topic, and wherein the activity characteristics comprise patterns of communication of one or more users associated with each communication channel;
determining user information from the activity characteristics, wherein the user information is associated with each user who interacts with other users on each communication channel;
determining timing information from the activity characteristics, wherein the timing information is associated with messages exchanged on each communication channel, and wherein the timing information comprises one or more of amounts of time each user spends on each communication channel, times each user interacts with a given communication channel, how frequently each user interacts with a given communication channel, and how each user interacts with a given communication channel;
determining notification cycles for sending notifications to users associated with a particular communication channel based on one or more notification policies, wherein at least one notification policy of the one or more notification policies comprises:
sending the notifications to a first subset of users associated with the particular communication channel during a first notification cycle; and
sending the notifications to a second subset of users associated with the particular communication channel during a second notification cycle; and
managing notifications to the users who communicate with each other on each communication channel based at least in part on the user information and the timing information on the notification cycles.

16. The method of claim 15, further comprising determining a relevancy of the at least one communication channel, wherein the relevancy is based at least in part on a topic affinity.

17. The method of claim 15, wherein the user information includes a list of the users who communicate with each other on the at least one communication channel.

18. The method of claim 15, wherein the timing information comprises active-time information.

19. The method of claim 15, wherein the timing information comprises response-time information.

20. The method of claim 15, wherein the managing of the notifications further comprises filtering one or more notifications based on the one or more notification policies, and wherein the one or more notification policies are based at least in part on the activity characteristics.

* * * * *